US011787530B2

(12) United States Patent
Nam et al.

(10) Patent No.: US 11,787,530 B2
(45) Date of Patent: Oct. 17, 2023

(54) FAIL SAFETY APPARATUS OF AIR MOBILITY

(71) Applicants: Hyundai Motor Company, Seoul (KR); Kia Corporation, Seoul (KR)

(72) Inventors: Youn Sic Nam, Daejeon (KR); Ui Jin Jung, Gyeonggi do (KR); Young Tae Kim, Gyeonggi do (KR); Young Heon Kim, Incheon (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 53 days.

(21) Appl. No.: 17/531,950

(22) Filed: Nov. 22, 2021

(65) Prior Publication Data
US 2022/0332410 A1  Oct. 20, 2022

(30) Foreign Application Priority Data

Apr. 19, 2021  (KR) .......................... 10-2021-0050585

(51) Int. Cl.
*B64C 27/00*  (2006.01)
*B64C 27/57*  (2006.01)

(52) U.S. Cl.
CPC ............ *B64C 27/006* (2013.01); *B64C 27/57* (2013.01)

(58) Field of Classification Search
CPC .............................. B64C 27/006; B64C 27/57
See application file for complete search history.

(56) References Cited

U.S. PATENT DOCUMENTS

2017/0183081 A1\*  6/2017  Du .......................... B64C 27/10

FOREIGN PATENT DOCUMENTS

| CN | 205311899 U | | 6/2016 |
|---|---|---|---|
| CN | 108557053 A | \* | 9/2018 |
| CN | 210707885 U | \* | 6/2020 |
| KR | 10-2020-0104582 A | | 9/2020 |

OTHER PUBLICATIONS

Wang, CN210707885U English Translation, 2020 (Year: 2020).\*
Ye, CN108557053A English Translation, 2018 (Year: 2018).\*

\* cited by examiner

*Primary Examiner* — Michael L Sehn
(74) *Attorney, Agent, or Firm* — Fox Rothschild LLP

(57) ABSTRACT

A fail safety apparatus of the air mobility is provided. Locations of propeller modules are adjusted by rotation parts and length adjustment units to evenly distribute thrust of the re-located propeller modules so that the attitude of the air mobility is stabilized. In particular, when one propeller module among a plurality of propeller modules fails, the attitude of the air mobility is normalized by adjusting a location of the failed propeller module and locations of remaining normal propeller modules so that flight safety of the air mobility is secured.

12 Claims, 9 Drawing Sheets

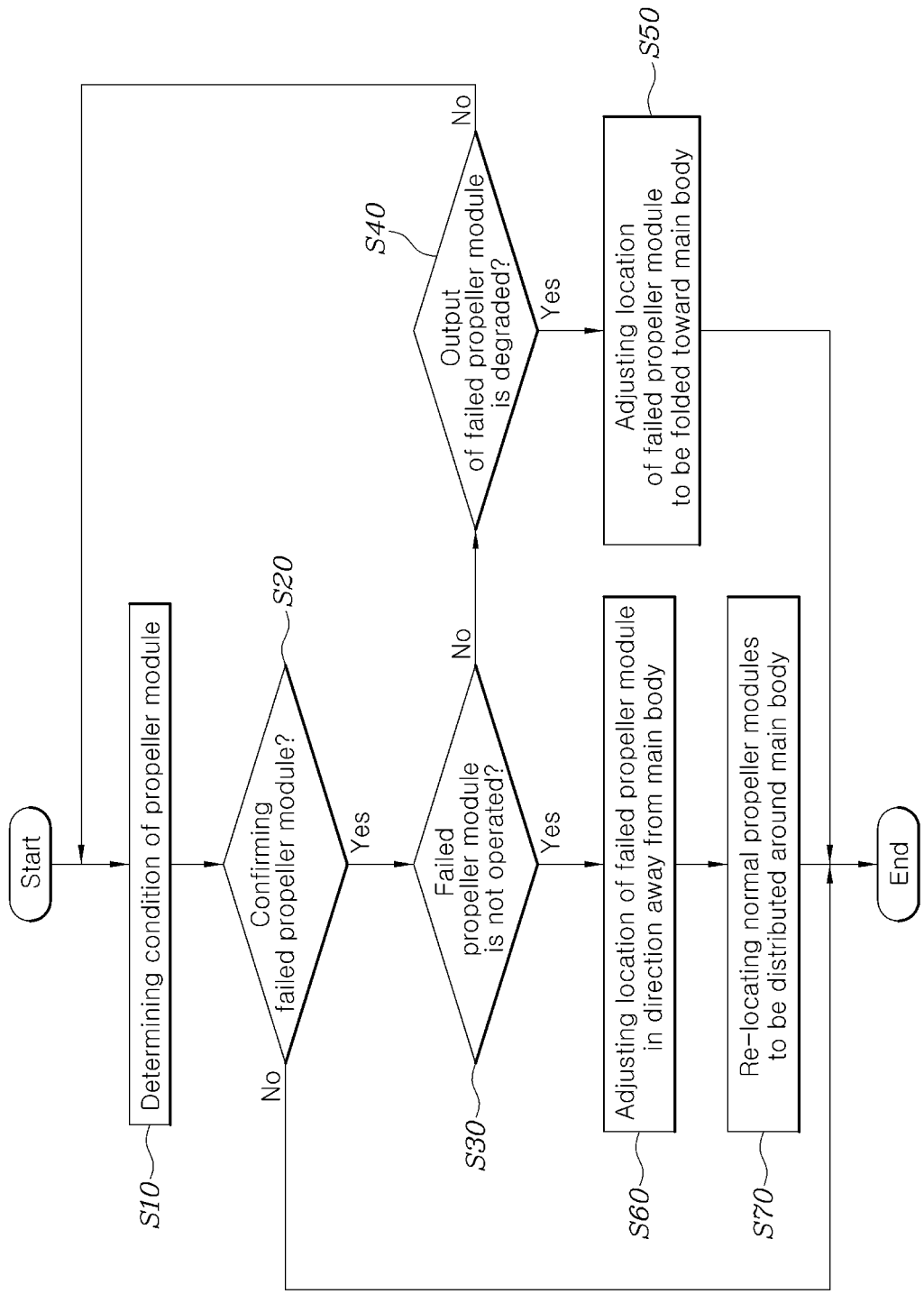

FAIL SAFETY APPARATUS OF AIR MOBILITY

CROSS REFERENCE TO RELATED APPLICATION

The present application claims priority to Korean Patent Application No. 10-2021-0050585, filed Apr. 19, 2021, the entire contents of which is incorporated herein for all purposes by this reference.

BACKGROUND OF THE DISCLOSURE

Field of the Disclosure

The present disclosure relates generally to a fail safety apparatus of an air mobility and, more particularly, to a fail safety apparatus of an air mobility, which is capable of maintaining normal flight of the air mobility, when any one propeller among a plurality of propellers has failed, by adjusting locations of remaining normal propellers.

Description of the Related Art

Recently, air mobility used in various fields such as cargo containers and medical transportation is under development, and energy efficiency improvement and stabilization technology of an air mobility has been developed and is reaching the stage of practical use. The air mobility flies through the operation of propellers, whereby vertical take-off and landing, and flight of the air mobility are realized.

However, the propellers of the air mobility have a problem that storage convenience thereof is deteriorated as the size of the propellers must be secured for efficient thrust generation. In addition, when one of the propellers has failed during flight of the air mobility, the air mobility maintains the flight by controlling the operation of the remaining propellers, but locations of the propellers are fixed, causing difficulty in maintaining flight stability of the air mobility.

The foregoing is intended merely to aid in the understanding of the background of the present disclosure, and is not intended to mean that the present disclosure falls within the purview of the related art that is already known to those skilled in the art.

SUMMARY OF THE DISCLOSURE

Accordingly, the present disclosure provides a fail safety apparatus of the air mobility, which is capable of performing normal flight with stable attitude of the air mobility, when any one propeller among a plurality of propellers has failed, by adjusting locations of remaining normal propellers.

In order to achieve the above objective, according to one aspect of the present disclosure, a fail safety apparatus of the air mobility may include: a main body of the air mobility; a plurality of rotation parts arranged along circumference of the main body while being spaced apart from each other, and configured to be rotatable sideways; a plurality of length adjustment units provided at the plurality of rotation parts, respectively, the plurality of length adjustments units including respective propeller modules at distal ends thereof and being configured to be adjusted in length in a direction toward or away from the main body; and a controller configured to receive a drive condition of each of the propeller modules, and in response to detecting a failure in any one of the propeller modules fails, the controller is configured to adjust a location of each propeller module by controlling each rotation part and each length adjustment unit to evenly distribute thrust due to driving of the propeller module with the main body as center.

The rotation parts may be rotatably provided on the main body, each of the rotation parts including a shaft part connected to an associated one of the length adjustment units, and a rotation drive part connected from the main body to the shaft part and configured to rotate the shaft part sideways.

Each of the length adjustment units may be adjusted in length as a plurality of sleeve parts may overlap each other and slide, and a front end sleeve part of the sleeve parts may be fixed to an associated one of the rotation parts and an associated propeller module may be provided at a distal end sleeve part thereof.

Each of the length adjustment units may include a length adjusting drive part provided in the front end sleeve part and the distal end sleeve part may be connected to the length adjusting drive part, so the length adjustment unit may be adjusted in length while the sleeve parts may slide in response to operation of the length adjusting drive part. Each of the propeller modules may include a propeller drive part provided at the distal end sleeve part, and a propeller hub including a plurality of wings and configured to receive rotation power of the propeller drive part and to rotate. The main body may include at least three rotation parts and at least three length adjustment units, and be configured to fly by driving of least three propeller modules.

When the controller determines that output of the one of the propeller modules is degraded, the controller may be configured to operate one of the length adjustment units where the failed propeller module with degraded output may be located to thus operate the failed propeller module to move in the direction away from the main body. When the controller determines that output of the one of the propeller modules is degraded, the controller may be configured to calculate moments of normal propeller modules and a moment of the failed propeller module with degraded output, and compensate the moment of the failed propeller module by controlling one of the length adjustment units where the failed propeller module may be located, to thus move the failed propeller module away from the main body.

When the controller determines that the one of the propeller modules is not operated, the controller may be configured to control the length adjustment units and the rotation parts to fold the failed propeller module toward the main body, and remaining normal propeller modules may be re-located while being distributed around the main body. When the controller determines that the one of the propeller modules is not operated, the controller may be configured to control the length adjustment units and the rotation parts to adjust locations of normal propeller modules toward the failed propeller module.

A control method of the fail safety apparatus of the air mobility may include: confirming, by the controller, a drive condition of the propeller module; when any one of the propeller modules fails, defining, by the controller, the propeller module as a failed propeller module, and determining a failure condition of the failed propeller module; deriving, by the controller, optimal arrangement of the failed propeller module away from the main body in response to the failure condition of the failed propeller module; and adjusting, by the controller, a location of the failed propeller module to the calculated optimal arrangement.

In the deriving of the optimal arrangement of the failed propeller module, in response to determining that output of the failed propeller module is degraded in the determining of the failure condition, an adjusted location of the failed propeller module in the direction away from the main body may be derived. In the deriving of the optimal arrangement of the failed propeller module, the adjusted location of the failed propeller module may be derived by calculating moments of normal propeller modules and a moment of the failed propeller module, and by deriving a moment of the failed propeller module compensated when the failed propeller module moves in the direction away from the main body relative to the normal propeller modules.

In the deriving of the optimal arrangement of the failed propeller module, when the controller determines, in the determining of the failure condition, that the failed propeller module is not operated, the adjusted location of the failed propeller module may be derived to thus fold the failed propeller module toward the main body. In the adjusting of the location of the failed propeller module, remaining normal propeller modules excluding the failed propeller module may be re-located while being distributed around the main body. In the adjusting of the location of the failed propeller module, locations of the normal propeller modules may be adjusted toward the failed propeller module.

As described above, the fail safety apparatus of the air mobility is configured such that thrust of the re-located propeller modules is evenly distributed by adjusting the locations of the propeller modules by the rotation parts and the length adjustment units. Accordingly, the attitude of the air mobility is stabilized. When any one propeller module among the plurality of propeller modules has failed, the attitude of the air mobility is normalized by adjusting the location of the failed propeller module and the locations of the normal propeller modules. Accordingly, flight safety of the air mobility is secured.

BRIEF DESCRIPTION OF THE DRAWINGS

The above and other objectives, features, and other advantages of the present disclosure will be more clearly understood from the following detailed description when taken in conjunction with the accompanying drawings, in which:

FIG. 9 is a flowchart showing the control of the fail safety apparatus of the air mobility according to the present disclosure.

DETAILED DESCRIPTION OF THE DISCLOSURE

Hereinbelow, a fail safety apparatus of the air mobility according to an exemplary embodiment of the present disclosure will be described with reference to accompanying drawings.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Figure 1:
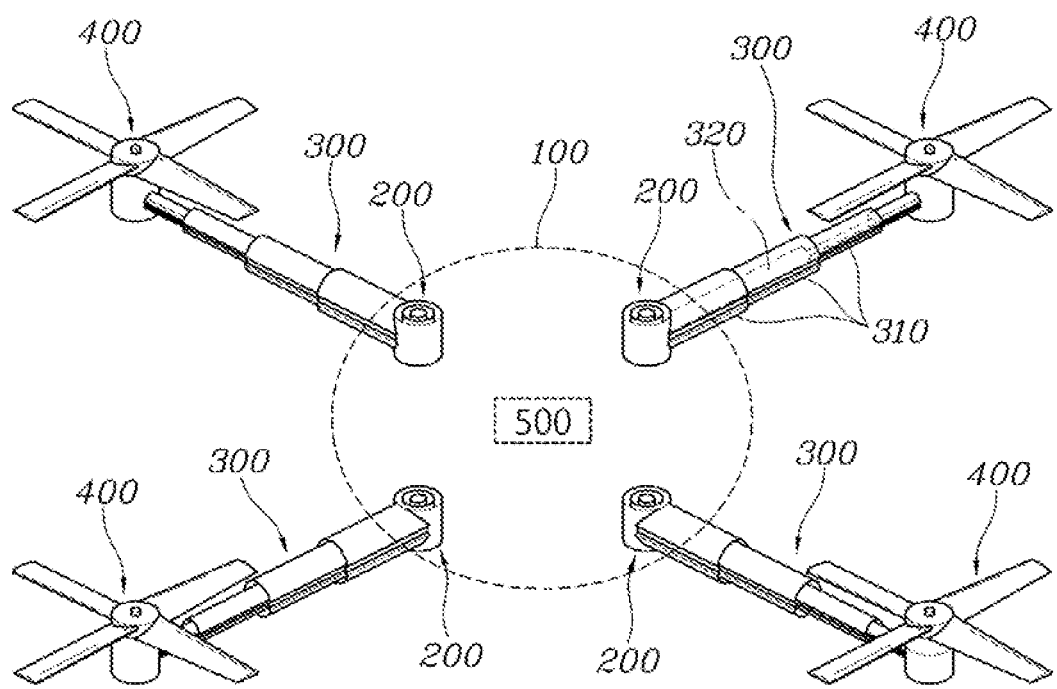
FIG. 1 is a view showing a fail safety apparatus of the air mobility according to the present disclosure.
Figure 2:
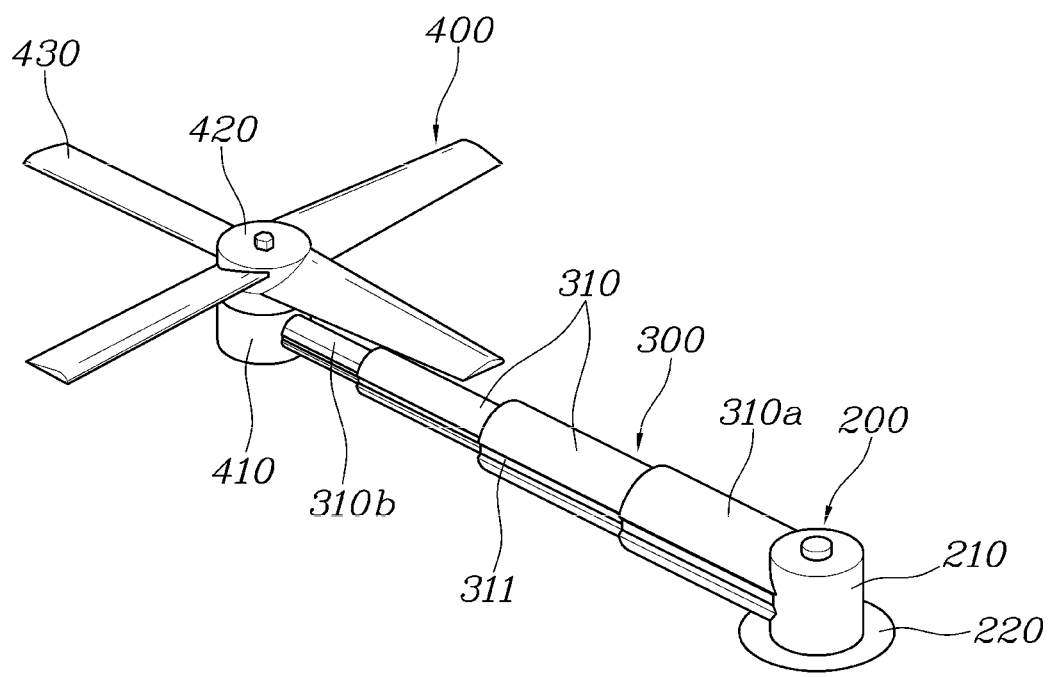
FIGS. 2 and 3 are views showing situations of a pre-operation and post-operation of the fail safety apparatus of the present disclosure.
Figure 3:
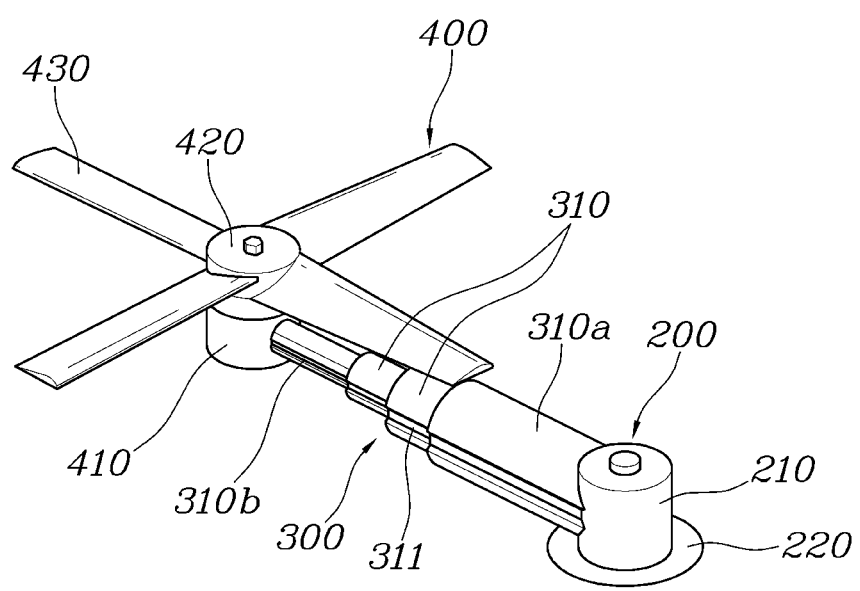
Figure 4:
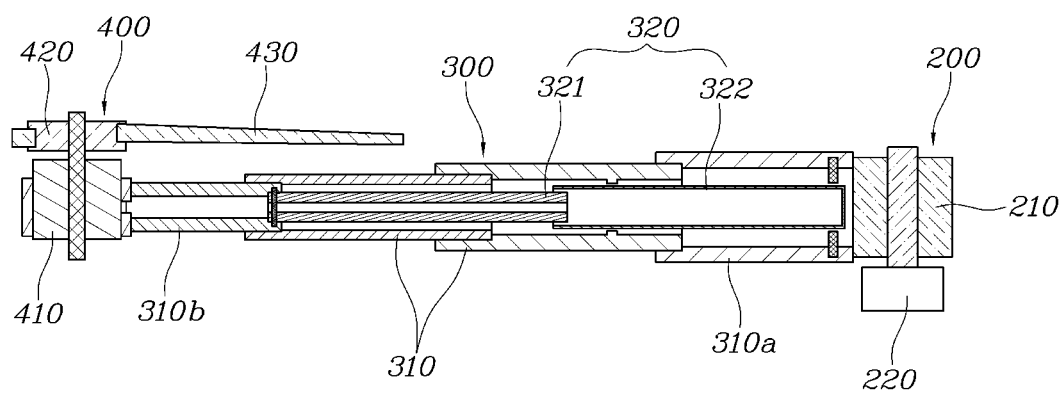
FIG. 4 is a sectional view showing the fail safety apparatus of the air mobility in FIG. 1.
Figure 5:
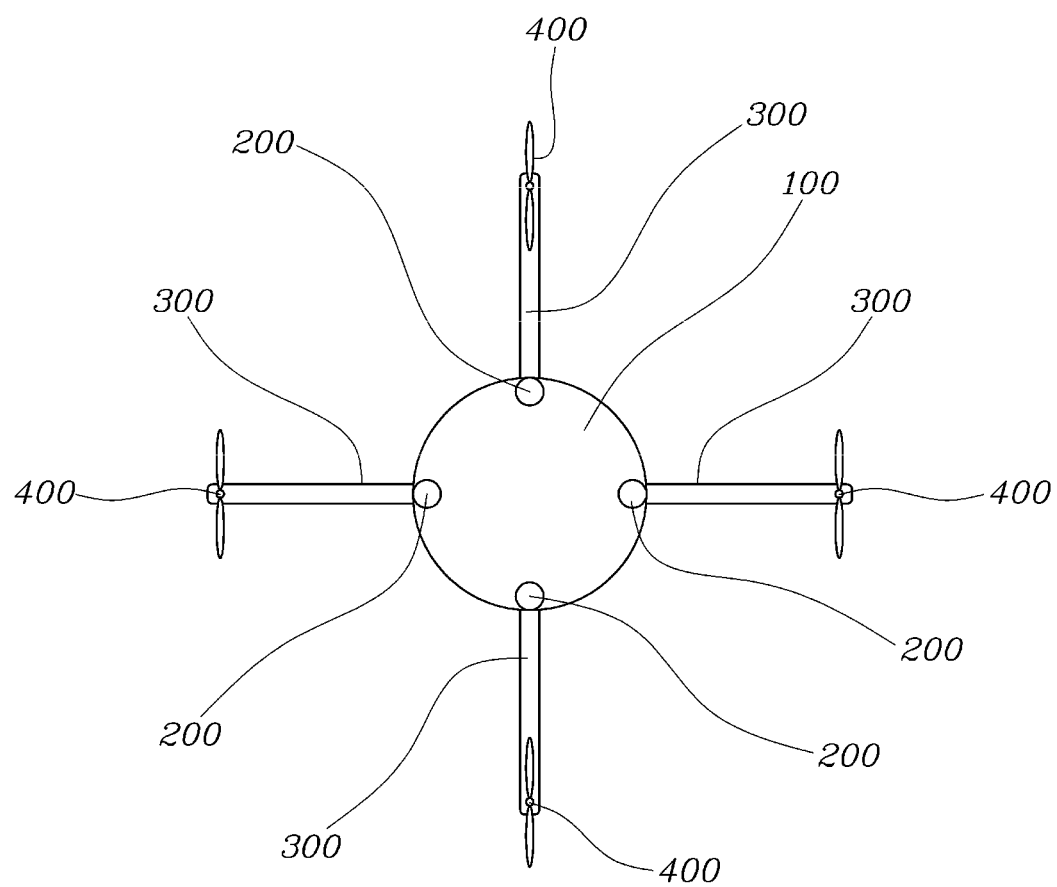
FIG. 5 is a view showing a normal condition in which each propeller module is operated normally.
Figure 6:
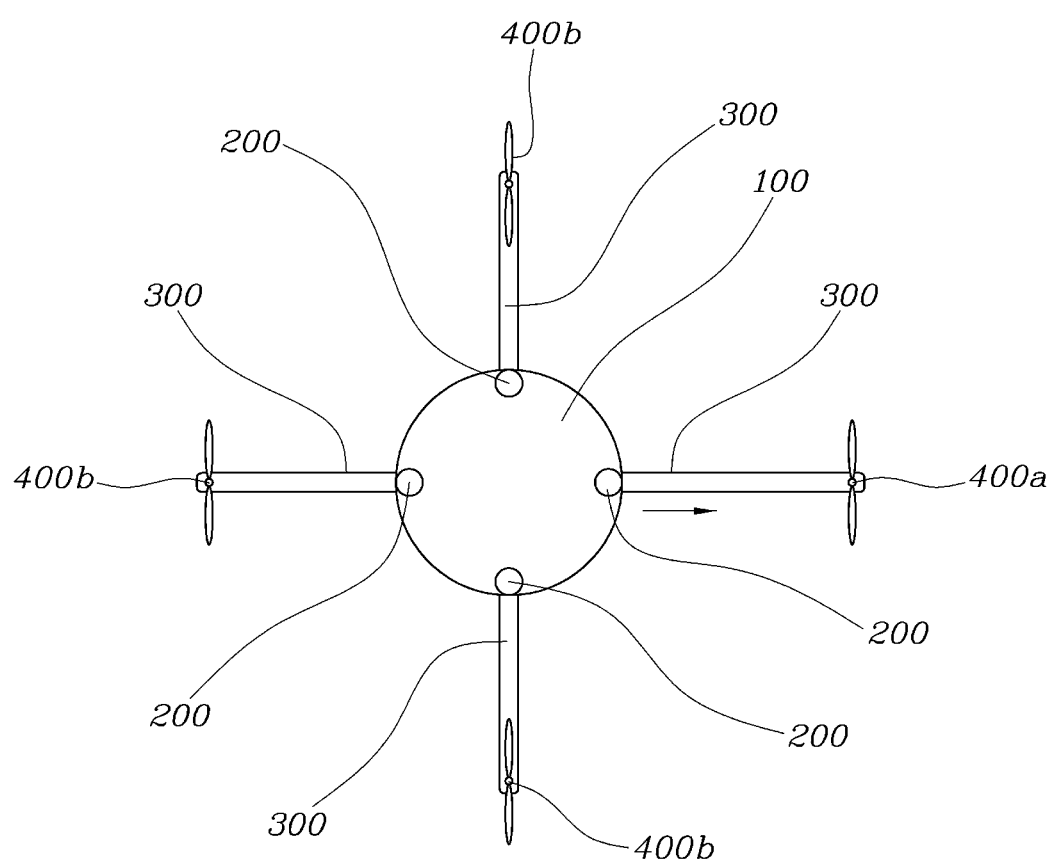
FIG. 6 is a view showing an embodiment when failure of a propeller module occurs.
Figure 7:
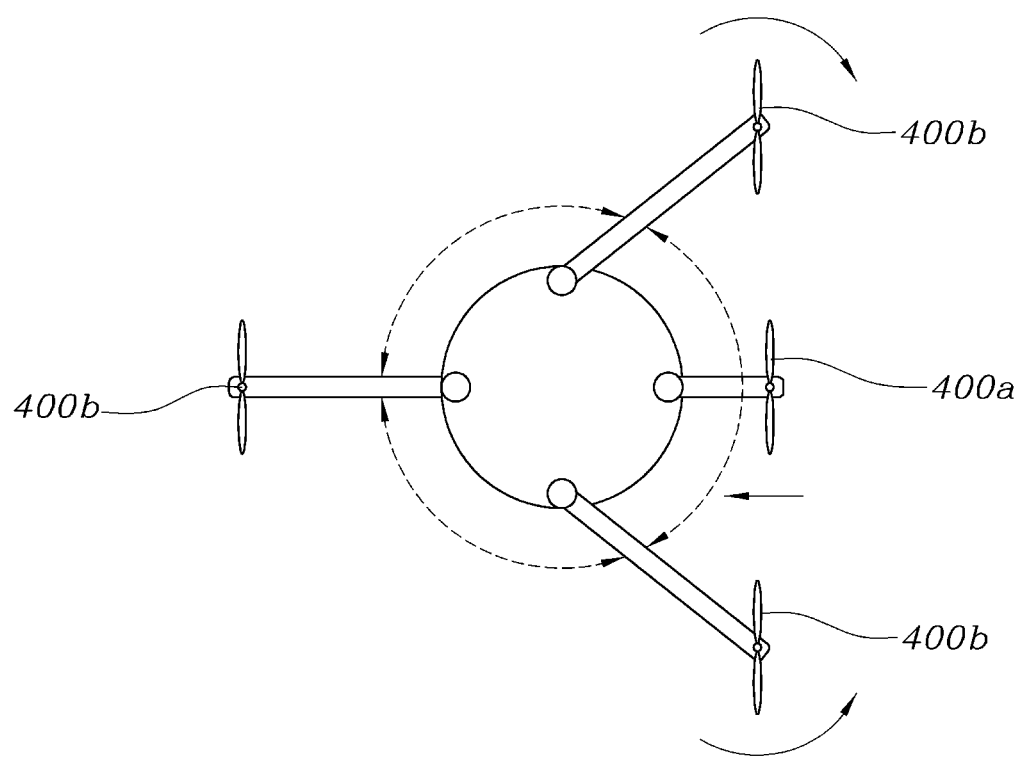
FIG. 7 is a view showing another embodiment when failure of a propeller module occurs.
Figure 8:
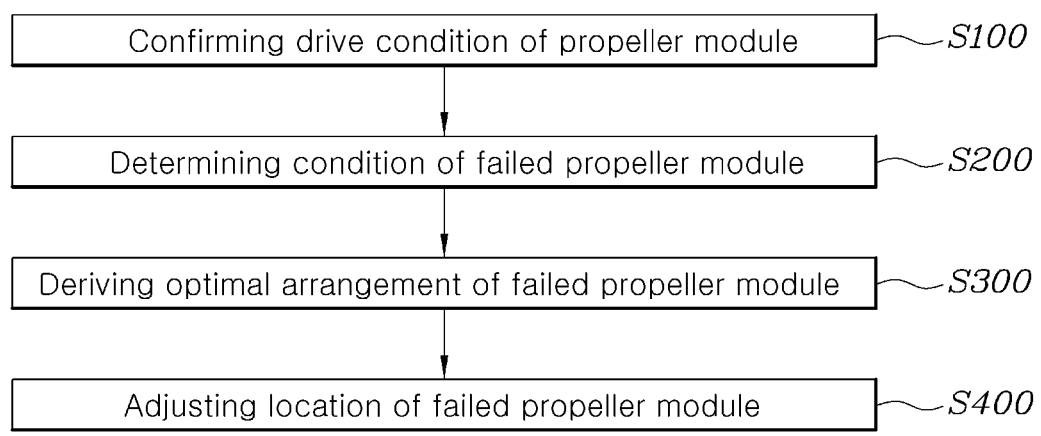
FIG. 8 is a flowchart of a control method of the fail safety apparatus of the air mobility according to the present disclosure.

FIG. 1 is a view showing the fail safety apparatus of the air mobility according to the present disclosure. FIGS. 2 and 3 are views showing situations of a pre-operation and post-operation of the fail safety apparatus of the present disclosure. FIG. 4 is a sectional view showing the fail safety apparatus of the air mobility in FIG. 1. FIG. 5 is a view showing a normal condition in which each propeller module is operated normally. FIG. 6 is a view showing an embodiment when failure of a propeller module occurs. FIG. 7 is a view showing another embodiment when failure of a propeller module occurs. FIG. 8 is a flowchart of a control method of the fail safety apparatus of the air mobility according to the present disclosure. FIG. 9 is a flowchart showing the control of the fail safety apparatus of the air mobility according to the present disclosure.

As shown in FIGS. 1 to 3, the fail safety apparatus of the air mobility according to the present disclosure may include: a main body 100 of the air mobility; a plurality of rotation parts 200 arranged along circumference of the main body 100 while being spaced apart from each other, and provided to be rotatable sideways; a plurality of length adjustment units 300 provided at the plurality of rotation parts 200, including respective propeller modules 400 at distal ends thereof, and configured to be adjusted in length in a direction toward or away from the main body 100; and a controller 500 configured to receive a drive condition of each of the propeller modules 400, and when any one of the propeller modules 400 has failed, the controller may be configured to adjust a location of the propeller module 400 by controlling each rotation part 200 and each length adjustment unit 300 to evenly distribute thrust due to driving of the propeller module 400 with the main body 100 as the center.

The main body 100 may include the plurality of rotation parts 200 and the plurality of length adjustment units 300, so the main body 100 includes the plurality of propeller modules 400. The air mobility may fly by thrust generated by driving of the propeller modules 400 as the propeller modules 400 are arranged to be spaced apart from each other with the main body 100 as the center.

In particular, according to the present disclosure, a location of the propeller module 400 may be adjusted by movements of the rotation part 200 and the length adjustment unit 300. The rotation part 200 is provided to be rotatable sideways from the main body 100, and the length adjustment unit 300 is provided at the rotation part 200 and may be adjusted in length in the direction toward or away from the main body 100. The propeller module 400 may be provided at a distal end of the length adjustment unit 300 and a location thereof may be changed by the movements of the rotation part 200 and the length adjustment unit 300. In particular, the rotation part 200 is rotatably provided on the main body 100 as shown in FIG. 4, and may include a shaft part 210 connected to the length adjustment unit 300, and a rotation drive part 220 provided to be connected from the main body 100 to the shaft part 210 and configured to rotate the shaft part 210 sideways.

The rotation part 200 may include the shaft part 210 and the rotation drive part 220. The shaft part 210 may be a housing rotatably provided at the main body 100 and the rotation drive part 220 may be a motor provided at the main body 100, connected to the shaft part 210, and rotating the shaft part 210. The rotation part 200 may be operated by the controller 500, and when the rotation drive part 220 is operated by the controller 500, the shaft part 210 rotates sideways from the main body 100 by the rotation drive part 220, thereby changing a location of the propeller module 400 together with a location of the length adjustment unit 300 coupled to the shaft part 210.

Meanwhile, the length adjustment unit 300 may be adjusted in length as a plurality of sleeve parts 310 overlaps each other and slides. A front end sleeve part 310a of the sleeve parts may be fixed to the rotation part 200, and the propeller module 400 may be provided at a distal end sleeve part 310b thereof. The length adjustment unit 300 may include the plurality of sleeve parts 310, and the plurality of sleeve parts 310 may overlap each other and move in a sliding manner, to thus adjust the total length of the length adjustment unit. In other words, the plurality of sleeve parts 310 have an end of one of the sleeve part inserted into another sleeve part to achieve an overlapping structure, so that the length of the length adjustment unit may be changed. Each of the sleeve parts 310 may include a guide slit 311 at a circumferential surface thereof, and guide slits 311 of the sleeve parts 310 match with each other, to provide smooth sliding of the sleeve parts 310.

The length adjustment unit 300 may have the front end sleeve part 310a fixed to the rotation part 200 and the distal end sleeve part 310b with the propeller module 400. Therefore, when the sleeve parts 310 slide, the propeller module 400 may be configured to move in the direction away from the main body 100 or the direction toward the main body 100. In particular, since the length adjustment unit 300 includes a length adjusting drive part 320 provided in the front end sleeve part 310a and the distal end sleeve part 310b connected to the length adjusting drive part 320, the sleeve parts 310 may slide in response to operation of the length adjusting drive part 320, to thus adjust the length of the length adjustment unit 300.

As shown in FIG. 4, the length adjusting drive part 320 is a linear actuator, and a power part 321 may be provided in the front end sleeve part 310a and a moving part 322 may be connected to the distal end sleeve part 310b. Therefore, since the length adjustment unit 300 is operated such that the sleeve parts 310 slide by the movement of the moving part 322 when the length adjusting drive part 320 is operated, a location of the propeller module 400 may be changed.

Meanwhile, the propeller module 400 may include a propeller drive part 410 provided at the distal end sleeve part 310b and a propeller hub 420 having a plurality of wings 430 and configured to receive rotation power of the propeller drive part 410 and to rotate. In the propeller module 400, when the propeller drive part 410 provided at the distal end sleeve part 310b is operated and generates the rotation power, the propeller hub 420 may be configured to receive the rotation power and rotate, so that the wings 430 connected to the propeller hub 420 rotate and generate thrust.

As described above, according to the present disclosure, the location change of the propeller module 400 may be achieved as the propeller module 400 rotates around the main body 100 by the rotation part 200, or moves in the direction toward or away from the main body 100 by the length adjustment unit 300, so that realization of a safe attitude of the air mobility is possible. Meanwhile, the controller 500 of the present disclosure receives a drive condition of each of the propeller modules 400. The drive condition of the propeller module 400 may be output information of the propeller module 400, and the controller may be configured to receive the information based on current value, rotation speed, etc. of the propeller module 400 by a sensor provided at the propeller module 400. Through the information, the controller 500 may be configured to determine whether the propeller module 400 has failed, and in response to determining that any one of the propeller modules 400 has failed, the controller may be configured to adjust locations of the propeller modules 400 by controlling the rotation parts 200 and the length adjustment units 300, so that thrust in response to the driving of the propeller modules 400 is evenly arranged around the main body 100.

When the controller 500 determines that one of the propeller modules 400 has failed, the controller is configured to adjust locations of the propeller modules 400 by controlling the rotation parts 200 and the length adjustment units 300 so that an insufficient thrust of the failed propeller module 400 is compensated and the attitude of the air mobility is stabilized. The controller 500 may be configured to confirm thrust in response to driving of the propeller modules 400 and re-locate the propeller modules to evenly distribute thrust in response to driving of the propeller modules 400 around the main body 100.

Therefore, in the present disclosure, the fail safety apparatus may include at least three rotation parts 200 and at least three length adjustment units 300, for the air mobility to fly by driving of at least three propeller modules 400. In other words, the present disclosure may be applied to air mobility having at least three propeller modules 400. Therefore, as the location of the propeller module 400 is adjusted in response to operation of the plurality of propeller modules 400, thrust of the propeller modules 400 may be evenly distributed. In the description of the present disclosure, air mobility is illustrated with four rotation parts 200, four length adjustment units 300, and four propeller modules 400 to help understanding of the disclosure.

The fail safety apparatus of the present disclosure may be controlled as follows.

When the controller 500 determines that output of the propeller module 400 is degraded, the controller 500 may be configured to operate one of length adjustment units 300 where the failed propeller module 400a with the degraded output is provided, to move the failed propeller module 400a in the direction away from the main body 100. The controller 500 may be configured to receive the information based on current value, rotation speed, etc. of the propeller module 400 gathered by the sensor to determine a condition of the propeller module 400. In response to determining that output of the propeller module 400 is degraded, the controller 500 may be configured to identify the propeller module 400 as the failed propeller module 400a, and operate the length adjustment unit 300 with the failed propeller module 400a to adjust a location of the failed propeller module 400a in the direction away from the main body 100. In other words, in response to determining that output of the propeller module 400 is degraded, the controller 500 may be configured to derive the optimum arrangement of the failed propeller module 400a. A moment of the failed propeller module 400a may be calculated by multiplication of thrust and the length of the length adjustment unit 300, and the controller 500 may be configured to adjust movement of the length adjustment unit 300 to move the propeller module 400 away from the main body 100 to compensate degraded output of the failed propeller module 400a.

In particular, when the controller 500 determines that the output of the propeller module 400 is degraded, the controller 500 may be configured to calculate moments of normal propeller modules 400b and a moment of the failed propeller module 400a with degraded output, and compensate the moment of the failed propeller module 400a by operating the length adjustment unit 300 with the failed propeller module 400a, so that the failed propeller module 400a moves away from the main body 100.

When failure of the propeller module 400a with the degraded output occurs, the controller may be configured to operate the remaining normal propeller modules 400b to maintain movements thereof and only the failed propeller module 400a to move away from the main body 100 to compensate degraded output. The controller 500 may be configured to compare the moment of the failed propeller module 400a and the moments of the normal propeller modules 400b, and extend the length of the length adjustment unit 300 with the failed propeller module 400a to compensate the moment of the failed propeller module 400a.

For example, when the failed propeller module 400a with degraded output occurs in a condition in which all the propeller modules 400 are normal as shown in FIG. 5, the controller may be configured to operate the length adjustment unit 300 to adjust the failed propeller module 400a away from the main body 100 as shown in FIG. 6, and compensate the moment of the failed propeller module such that the moments of the normal propeller modules 400b and the moment of the failed propeller module 400a have values similar to each other. Accordingly, air mobility may be configured to perform a safety flight by maintaining its attitude even when the failed propeller module 400a with degraded output occurs.

Meanwhile, when the controller 500 determines that the propeller module 400 is not operated, the controller may be configured to operate the length adjustment units 300 and the rotation parts 200, to fold the failed propeller module 400a toward the main body 100, and re-locate the remaining normal propeller modules 400b while being distributed around the main body 100.

As described above, when the propeller module 400 is not operating, the controller 500 may be configured to operate the rotation part 200 and the length adjustment unit 300 corresponding to the failed propeller module 400a to fold the failed propeller module 400a toward the main body 100. Accordingly, the failed propeller module 400a not operated does not interfere with the remaining normal propeller modules 400b. In addition, since the normal propeller modules 400b are re-located while being distributed around the main body 100, the attitude of the air mobility may be stabilized by the movements of the normal propeller modules 400b.

Specifically, when the controller 500 determines that the propeller module 400 is not operated, the controller may be configured to operate the length adjustment units 300 and the rotation parts 200, to adjust locations of the normal propeller modules 400b toward the failed propeller module 400a. When the propeller module 400 is not operated, thrust of the failed propeller module 400a should be compensated by the normal propeller modules 400b. Accordingly, the controller 500 allows the failed propeller module 400a not operated to be folded, and may be configured to adjust locations of normal propeller modules 400b located at the surrounding of the failed propeller module 400a toward the failed propeller module 400a, to normalize the attitude of the air mobility. As an example, based on a virtual line connecting each radius from the center of the main body 100 to the center of each of the normal propeller modules 400b excluding the failed propeller module 400a, the controller 500 may be configured to operate the rotation parts 200 and the length adjustment units 300 to locate the normal propeller modules 400b on the virtual line.

Accordingly, when the failed propeller module 400a not operated occurs in the condition where all the propeller modules 400 are normal as shown in FIG. 5, the controller may be configured to fold the failed propeller module 400a toward the main body 100 and adjust the locations of the normal propeller modules 400b to be distributed around the main body 100 as shown in FIG. 7, thereby maintaining the attitude of the air mobility and performing a safety flight.

Meanwhile, according to the present disclosure, as shown in FIG. 8, a control method of the fail safety apparatus of the air mobility may include: confirming, by the controller, a drive condition of each propeller module (S100); determining by the controller, when the propeller module has failed, defining the propeller module as the failed propeller module and determining a failure condition of the failed propeller module (S200); deriving, by the controller, optimum arrangement of the failed propeller module away from the main body in response to the failure condition of the failed propeller module (S300); and adjusting, by the controller, a location of the failed propeller module to the derived optimum arrangement (S400).

Through the confirming of the drive condition of each propeller module (S100), the controller may be configured to determine that each of the propeller modules is normally operated and one of the propeller modules fails. In response to confirming that the propeller module has failed, in the determining of the failure condition of the failed propeller module (S200) (hereinafter, which is referred to as the determining), the propeller module (with a problem) may be defined or identified as the failed propeller module, and a failure condition of the failed propeller module may be determined. A condition of the propeller module may be determined by receiving the information based on current value, rotation speed, etc. of the propeller module by the sensor.

Meanwhile, in the deriving of the optimal arrangement of the failed propeller module (S300) (hereinafter, which is referred to as the deriving), the optimum arrangement of the failed propeller module from the main body in response to the failure condition of the failed propeller module. In other words, the failed propeller module may be determined to be in a condition where output of the failed propeller module is degraded or a condition where the failed propeller module is not operated, thereby deriving the optimum arrangement of the failed propeller module. Accordingly, in the adjusting of the location of the failed propeller module (S400) (hereinafter, which is referred to as the adjusting), the failed propeller module may be adjusted to the optimum location of the failed propeller module derived in the deriving (S300), so that normal flight of the air mobility may be performed.

The above-described present disclosure will be described in detail, as shown in S10 to S70 in FIG. 9. In the deriving (S300), in response to determining, in the determining (S200), that the output of the failed propeller module is degraded, the controller may be configured to derive an adjusted location in the direction where the failed propeller module is away from the main body.

As described above, according to the present disclosure, the failed propeller module with degraded output is adjusted in location in the direction away from the main body, thereby compensating thrust of the failed propeller module, so that normal flight of the air mobility may be performed. A moment of the propeller module may be calculated by multiplication of thrust and a distance between the main body and the propeller module, to thus adjust a location of the failed propeller module to move away from the main body to compensate the degraded output of the failed propeller module. Specifically, in the deriving (S300), moments of the normal propeller modules and a moment of the failed propeller module may be calculated and a moment the failed propeller module compensated when the failed propeller module moves away from the main body is derived relative to the normal propeller modules, thereby deriving the adjusted location of the failed propeller module.

As described above, when the failed propeller module with degraded output occurs, the remaining normal propeller modules maintain operation thereof and only the failed propeller module moves away from the main body, to compensate degraded output. The moment of the failed propeller module and the moments of the normal propeller modules may be compared to each other and the failed propeller module moves away from the main body, to compensate the moment of the failed propeller module is compensated.

Meanwhile, in the deriving (S300), in response to determining, in the determining (S200), that the failed propeller module is not operated, an adjusted location is driven to allow the failed propeller module to be folded toward the main body. In the adjusting (S400), the remaining normal propeller modules excluding the failed propeller module may be adjusted to be re-located while being distributed around the main body. Therefore, the failed propeller module not operated does not interfere with the remaining normal propeller modules. The normal propeller modules may be re-located while being distributed around the main body, to stabilize the attitude of the air mobility by the movement of the normal propeller modules.

In the adjusting (S400), the locations of the normal propeller modules may be adjusted to move toward the failed propeller module. When the failed propeller module is not operated, thrust of the failed propeller module should be compensated by the remaining normal propeller modules. Therefore, the failed propeller module not operated may be folded and the normal propeller modules at the surrounding of the failed propeller module move toward the failed propeller module, so that the attitude of the air mobility is normalized.

The fail safety apparatus of the air mobility having the structure as described above is configured such that the location of the propeller modules 400 are adjusted by the rotation parts 200 and the length adjustment units 300, to evenly distribute thrust of the re-located propeller modules 400 thereby stabilizing the attitude of the air mobility. In particular, when one of the plurality of propeller modules 400 has failed, the location of the failed propeller module 400 and the locations of the normal propeller modules 400 may be adjusted to stabilize the attitude of the air mobility, thereby securing flight safety of the air mobility.

Although a preferred embodiment of the present disclosure has been described for illustrative purposes, those skilled in the art will appreciate that various modifications, additions and substitutions are possible, without departing from the scope and spirit of the disclosure as disclosed in the accompanying claims.

What is claimed is:

1. A fail safety apparatus of an air mobility, the fail safety apparatus comprising:
   a main body of the air mobility;
   a plurality of rotation parts arranged along the circumference of the main body while being spaced apart from each other, and configured to be rotatable sideways;
   a plurality of length adjustment units provided at the plurality of rotation parts, respectively, the plurality of length adjustment units including respective propeller modules at distal ends thereof and configured to be adjusted in length in a direction toward or away from the main body; and
   a controller configured to receive a drive condition of each of the propeller modules, and in response to determining that any one of the propeller modules fails, the controller is configured to adjust a location of each propeller module by controlling each rotation part and each length adjustment unit to evenly distribute thrust due to driving of the propeller module with the main body as center,
   wherein each of the length adjustment units includes a length adjusting drive part,
   wherein the length adjusting drive part includes a power part and a moving part such that a location of each of the propeller modules is changed by movement of the moving part when the power part of the length adjusting drive part is operated,
   wherein, when the controller determines that output of the one of the propeller modules is degraded, the controller is configured to operate one of the length adjustment units where the failed propeller module with degraded output is located to operate the failed propeller module to move in the direction away from the main body, and wherein, when the controller determines that output of the one of the propeller modules is degraded, the controller is configured to calculate moments of normal propeller modules and a moment of the failed propeller module with degraded output, and compensate the moment of the failed propeller module by controlling one of the length adjustment units where the failed propeller module is located to move the failed propeller module away from the main body.

2. The fail safety apparatus of claim 1, wherein the rotation parts are rotatably provided on the main body, each of the rotation parts including a shaft part connected to an associated one of the length adjustment units, and a rotation drive part connected from the main body to the shaft part and configured to rotate the shaft part sideways.

3. The fail safety apparatus of claim 1, wherein each of the length adjustment units is configured to be adjusted in length as a plurality of sleeve parts overlap each other and slide, and a front end sleeve part of the sleeve parts is fixed to an associated one of the rotation parts and an associated propeller module is provided at a distal end sleeve part thereof.

4. The fail safety apparatus of claim 3, wherein the length adjusting drive part is provided in the front end sleeve part and the distal end sleeve part is connected to the length adjusting drive part, to adjust the length adjustment unit in length while the sleeve parts slide in response to operation of the length adjusting drive part.

5. The fail safety apparatus of claim 3, wherein each of the propeller modules includes a propeller drive part provided at the distal end sleeve part, and a propeller hub having a plurality of wings and configured to receive rotation power of the propeller drive part and to rotate.

6. The fail safety apparatus of claim 1, wherein the main body includes at least three rotation parts and at least three length adjustment units, and is configured to fly by driving of least three propeller modules.

7. The fail safety apparatus of claim 1, wherein, when the controller determines that the one of the propeller modules is not operated, the controller is configured to operate the length adjustment units and the rotation parts to fold the failed propeller module toward the main body, and re-locate remaining normal propeller modules while being distributed around the main body.

8. The fail safety apparatus of claim 1, wherein, when the controller determines that the one of the propeller modules is not operated, the controller is configured to operate the length adjustment units and the rotation parts to adjust locations of normal propeller modules toward the failed propeller module.

9. A control method of a fail safety apparatus of an air mobility, the control method comprising:
providing the fail safety apparatus comprising:
a main body of the air mobility;
a plurality of rotation parts arranged along the circumference of the main body while being spaced apart from each other, and configured to be rotatable sideways;
a plurality of length adjustment units provided at the plurality of rotation parts, respectively, the plurality of length adjustment units including respective propeller modules at distal ends thereof and configured to be adjusted in length in a direction toward or away from the main body; and
a controller configured to receive a drive condition of each of the propeller modules, and in response to determining that any one of the propeller modules fails, the controller is configured to adjust a location of each propeller module by controlling each rotation part and each length adjustment unit to evenly distribute thrust due to driving of the propeller module with the main body as center,
confirming, by the controller, a drive condition of any one of the propeller modules;
in response to determining that the any one of the propeller modules fails, identifying, by the controller, the any one of the propeller modules as a failed propeller module, and determining a failure condition of the failed propeller module;
deriving, by the controller, optimal arrangement of the failed propeller module away from the main body in response to the failure condition of the failed propeller module; and
adjusting, by the controller, a location of the failed propeller module to the calculated optimal arrangement,
wherein, in the deriving of the optimal arrangement of the failed propeller module, in response to determining that output of the failed propeller module is degraded in the determining of the failure condition, an adjusted location of the failed propeller module in the direction away from the main body is derived, and
wherein, in the deriving of the optimal arrangement of the failed propeller module, the adjusted location of the failed propeller module is derived by calculating moments of normal propeller modules and a moment of the failed propeller module, and by deriving a moment of the failed propeller module compensated when the failed propeller module moves in the direction away from the main body relative to the normal propeller modules.

10. The control method of claim 9, wherein, in the deriving of the optimal arrangement of the failed propeller module, when the controller determines, in the determining of the failure condition, that the failed propeller module is not operated, the adjusted location of the failed propeller module is derived to fold the failed propeller module toward the main body.

11. The control method of claim 10, wherein, in the adjusting of the location of the failed propeller module, remaining normal propeller modules excluding the failed propeller module are re-located while being distributed around the main body.

12. The control method of claim 11, wherein, in the adjusting of the location of the failed propeller module, locations of the normal propeller modules are adjusted toward the failed propeller module.

* * * * *